United States Patent
Gerke et al.

(10) Patent No.: US 11,876,980 B2
(45) Date of Patent: Jan. 16, 2024

(54) OPTIMIZING VIDEO ENCODING AND/OR TRANSMISSION FOR REMOTE DRIVING APPLICATIONS

(71) Applicant: Vay Technology GmbH, Berlin (DE)

(72) Inventors: Sebastian Gerke, Berlin (DE); Bogdan Diukic, Berlin (DE); Matthias Albrecht, Berlin (DE); David Gossow, Berlin (DE)

(73) Assignee: Vay Technology GmbH, Berlin (DE)

(*) Notice: Subject to any disclaimer, the term of this patent is extended or adjusted under 35 U.S.C. 154(b) by 0 days.

(21) Appl. No.: 17/367,900

(22) Filed: Jul. 6, 2021

(65) Prior Publication Data

US 2022/0014763 A1  Jan. 13, 2022

(30) Foreign Application Priority Data

Jul. 7, 2020 (EP) .................................. 20184358

(51) Int. Cl.
*H04N 19/167* (2014.01)
*H04N 19/103* (2014.01)
(Continued)

(52) U.S. Cl.
CPC ......... *H04N 19/167* (2014.11); *G05D 1/0016* (2013.01); *G05D 1/0022* (2013.01);
(Continued)

(58) Field of Classification Search
CPC .. H04N 19/167; H04N 19/103; H04N 19/159; G05D 1/0016; G05D 1/0022; G05D 1/0217; G05D 1/0223; G05D 1/0246
See application file for complete search history.

(56) References Cited

U.S. PATENT DOCUMENTS 10,623,734 B1  4/2020  Shen et al.
2007/0013544 A1* 1/2007  Chiu ................... B60R 25/10
                                                     340/5.71
(Continued)

FOREIGN PATENT DOCUMENTS

CN   1048104    * 10/1994
CN   205726061  *  4/2016
(Continued)

OTHER PUBLICATIONS

Kada Tomoyasu translation of JP-2004206218—Dec. 2002 (Year: 2002).*
(Continued)

*Primary Examiner* — Zaihan Jiang
(74) *Attorney, Agent, or Firm* — Wood Herron & Evans LLP

(57) ABSTRACT

A vehicle adapted to be remotely driven via a wireless communication network comprises a capturing unit for capturing live video data of the vehicle's environment, a video encoding unit for video encoding the captured live video data, a transmission unit for transmitting the encoded live video data via the wireless communication network, and a control unit for controlling the video encoding unit and/or the transmission unit. The control unit controls the video encoding unit to optimize the video encoding of the captured live video data and/or to control the transmission unit to optimize the transmission of the encoded live video data. The controlling is based on one, two or all of: (i) predetermined location information associated with a current location of the vehicle; (ii) real-time driving information associated with current driving parameters of the vehicle, and; (iii) real-time environment information associated with a current environment of the vehicle.

16 Claims, 4 Drawing Sheets

(a)

(b)

(51) Int. Cl.
*H04N 19/159* (2014.01)
*G05D 1/00* (2006.01)
*G05D 1/02* (2020.01)

(52) U.S. Cl.
CPC ......... *G05D 1/0217* (2013.01); *G05D 1/0223* (2013.01); *G05D 1/0246* (2013.01); *H04N 19/103* (2014.11); *H04N 19/159* (2014.11); *G05D 2201/0213* (2013.01)

(56) References Cited

U.S. PATENT DOCUMENTS

| | | |
|---|---|---|
| 2015/0358537 A1 | 12/2015 | Mirza |
| 2017/0090480 A1* | 3/2017 | Ho .................. G05D 1/0027 |
| 2018/0155011 A1* | 6/2018 | Greiner ................. B64C 27/20 |
| 2019/0096244 A1 | 3/2019 | Guruva Reddiar et al. |
| 2019/0188505 A1 | 6/2019 | Madkor et al. |
| 2021/0122364 A1* | 4/2021 | Lee .................. B60W 10/04 |

FOREIGN PATENT DOCUMENTS

| | | | |
|---|---|---|---|
| CN | 109979201 | * | 6/2018 |
| CN | 110662044 A | | 1/2020 |
| JP | 2004206218 | * | 12/2002 |
| JP | 2019165364 A | | 9/2019 |
| KR | 20080058785 | * | 12/2006 |

OTHER PUBLICATIONS

Tian, Yu translation of CN-205726061—Apr. 2016 (Year: 2016).*
Li, Qing-chang translation of CN-1048104—Oct. 1994 (Year: 1994).*
Park, Jong-Rok translation of CN-109979201—Jun. 2018 (Year: 2018).*
Kim Jung Hyun translation of KR-20080058785 Dec. 2006 (Year: 2006).*
European Patent Office, Extended European Search Report issued in EP 20 18 4358.8-1209 dated Mar. 15, 2021 (16 pages).

* cited by examiner (a)

(b)

OPTIMIZING VIDEO ENCODING AND/OR TRANSMISSION FOR REMOTE DRIVING APPLICATIONS

CROSS-REFERENCE TO RELATED APPLICATION

This application claims priority to European Application No. 20184358.8, filed Jul. 7, 2020, with the same title as listed above. The above-mentioned patent application is incorporated herein by reference in its entirety.

TECHNICAL FIELD

The present invention relates to a vehicle that is adapted to be remotely driven via a wireless communication network. Moreover, the present invention relates to a system for remotely driving a vehicle via a wireless communication network. Furthermore, the present invention relates to a method for video encoding and/or transmission of live video data captured at a vehicle that is remotely driven via a wireless communication network.

BACKGROUND

Teleoperated remote driving of a vehicle is considered by many to be a transient technology toward fully autonomous driving in urban areas. In this mobility concept, a teleoperator uses a teleoperator station to remotely drive the vehicle via a wireless communication network. To this end, the teleoperator station receives live video data providing a view of the vehicle's environment from the vehicle and displays the live video data to the teleoperator. The teleoperator reacts to the live video data by using a control interface provided by the teleoperator station to generate drive control commands for controlling the driving of the vehicle. The drive control commands are sent from the teleoperator station to the vehicle.

In order for the teleoperator to be able to remotely drive the vehicle in a safe and efficient manner, a reliable transmission of the live video data of the vehicle's environment from the vehicle to the teleoperator station is required. To this end, the live video data that is captured at the vehicle is preferably compressed using modern video coding technology, such as H.264/AVC (Advanced Video Coding) or H.265/HEVC (High Efficiency Video Coding), wherein the video coding technology is preferably run in a modus that allows for ultra-low delay encoding and decoding. For example, the video coding technology may be run such that for encoding a frame of the live video data only already known video frames are used as reference frames to improve coding efficiency.

While today's wireless communication networks, such as fourth generation (4G) wireless communication networks or fifth generation (5G) wireless communication networks, show a remarkable increase in bandwidth and transmission speed compared to earlier wireless communication technologies, such as third generation (3G) wireless communication networks, the transmission channel is still limited in capacity, especially in cases such as hand-over between neighboring cells of the network. It is therefore desirable to be able to optimize the video encoding and/or transmission of the live video data that is captured at the remotely driven vehicle.

SUMMARY

It is an object of the present invention to provide a vehicle that is adapted to be remotely driven via a wireless communication network, which allows for an optimization of video encoding and/or transmission of the live video data that is captured at the vehicle. It is a further object of the present invention to provide a system for remotely driving a vehicle via a wireless communication network as well as a method for video encoding and/or transmission of live video data captured at a remotely driven vehicle.

In a first aspect of the present invention, a vehicle that is adapted to be remotely driven via a wireless communication network is presented, comprising: a capturing unit for capturing live video data of the vehicle's environment; a video encoding unit for video encoding the captured live video data; a transmission unit for transmitting the encoded live video data via the wireless communication network; and a control unit for controlling the video encoding unit and/or the transmission unit; wherein the control unit is adapted to control the video encoding unit to optimize the video encoding of the captured live video data and/or to control the transmission unit to optimize the transmission of the encoded live video data, wherein the controlling is based on one, two or all of: (i) pre-determined location information associated with a current location of the vehicle; (ii) real-time driving information associated with current driving parameters of the vehicle, and; (iii) real-time environment information associated with a current environment of the vehicle.

Since the vehicle that is adapted to be remotely driven via a wireless communication network comprises a control unit for controlling the video encoding unit and/or the transmission unit, and since the control unit is adapted to control the video encoding unit to optimize the video encoding of the captured live video data and/or to control the transmission unit to optimize the transmission of the encoded live video data, wherein the controlling is based on one, two or all of: (i) pre-determined location information associated with a current location of the vehicle; (ii) real-time driving information associated with current driving parameters of the vehicle, and; (iii) real-time environment information associated with a current environment of the vehicle, the perceived quality of the live video data at a teleoperator station may be improved. This, in turn, may greatly improve the safety of the remote driving operation.

The wireless communication network is preferably a network that allows for a bidirectional transmission of data between the vehicle and the teleoperator station. For example, it can be a fourth generation (4G) wireless communication network or a fifth generation (5G) wireless communication network.

The video encoding of the live video data that is captured at the vehicle is preferably performed such that it is compressed using modern video coding technology, such as H.264/AVC (Advanced Video Coding) or H.265/HEVC (High Efficiency Video Coding), wherein the video coding technology is preferably run in a modus that allows for ultra-low delay encoding and decoding. For example, the video coding technology may be run such that for encoding a frame of the live video data only already known video frames are used as reference frames to improve coding efficiency.

The vehicle is preferably a car, such as a small car, a regular car, or a Sports Utility Vehicle (SUV), a van, a truck or another type of vehicle that is adapted to be remotely driven. For example, it may also be a buggy or the like.

Preferably, the vehicle is a modified vehicle that provides the required on-board infrastructure for teleoperation. This can include actuators for controlling the vehicle, the capturing unit for capturing a live representation of the vehicle's environment, and appropriate interfaces for bi-directional communication with the teleoperator station via the wireless communication network. The actuators can be mechanical actuators that directly actuate on the vehicle's steering wheel, speed pedal and brakes. Alternatively, already present actuators of the vehicle (e.g., for adjusting the orientation of the vehicle's wheels) may be controlled via an electronic interface.

It is preferred that the control unit is adapted to control (i) one or more video encoding parameters, wherein the controlled video encoding parameter(s) is/are selected from the group consisting of: a bitrate; a spatial resolution; a color depth; a color format; a frame rate; a region-of-interest, a digital zoom, and; an insertion of intra coded frames, and/or (ii) a pre-processing of the captured live video data in order to simplify the video encoding of the captured live video data.

It is further preferred that the control unit is adapted to control (i) one or more transmission parameters, wherein the controlled transmission parameter(s) is/are selected from the group consisting of: a transmission bitrate; a transmission protection; a wireless communication network carrier, and; a prioritization of data packets via one or more wireless communication network carriers, and/or (ii), if multiple vehicles that are adapted to be remotely driven via the wireless communication network transmit encoded live video data in a same cell of the wireless communication network, an allocation of a transmission bitrate over the multiple vehicles.

It is preferred that the pre-determined location information is selected from the group consisting of: expected wireless communication network characteristics at the current location of the vehicle; an expected speed of the vehicle at the current location of the vehicle, and; a complexity of the environment at the current location of the vehicle.

It is further preferred that the real-time driving information is selected from the group consisting of: a current speed of the vehicle; a current direction of the vehicle; a current steering angle of the vehicle, and; a current inclination of the vehicle.

It is preferred that the real-time environment information is selected from the group consisting of: a time of day in the current environment of the vehicle; a weather in the current environment of the vehicle; lighting conditions in the current environment of the vehicle, and a traffic in the current environment of the vehicle.

It is further preferred that the pre-determined location information is provided in a map that has been determined a-priori.

It is preferred that the prioritization of data packets via one or more wireless communication network carriers comprises sending parts of the encoded live video data via a first carrier or network path with a first expected wireless communication network performance and sending other parts of the encoded live video data via a second carrier with a second expected wireless communication network performance, wherein the first expected wireless communication network performance and the second expected wireless communication network performance differ in terms of one, two, three or all of: a reliability of the carrier or network path, a latency of the carrier or network path, a cost of transmission via the carrier or network path, and an availability of the carrier or network path.

It is further preferred that the region-of-interest is given a higher bitrate in the video encoding of the captured live video data and/or that a size, shape and/or location of the region-of-interest is repeatedly adjusted in the captured live video data based on the pre-determined location information associated with the current location of the vehicle and/or the real-time driving information associated with current driving parameters of the vehicle and/or the real-time environment information associated with a current environment of the vehicle.

It is preferred that the expected wireless communication network characteristics at the current location of the vehicle comprise an expected latency of the wireless communication network and the prioritization of data packets via one or more wireless communication network carriers comprises a redundant transmission of parts of the encoded live video data via multiple carriers.

It is further preferred that the expected speed of the vehicle at the current location of the vehicle and/or the current speed of the vehicle and/or the current direction of the vehicle and/or the current steering angle of the vehicle and/or the current inclination of the vehicle is used by the control unit as an indication of how many bits to use for the video encoding of the captured live video data.

It is preferred that the capturing unit is adapted to capture the live video data of the vehicle's environment from multiple positions and/or in multiple directions and the control unit is adapted to control the video encoding unit and/or the transmission unit differently for parts of the live video data captured from different positions and/or different directions.

In a further aspect of the present invention, a system for remotely driving a vehicle via a wireless communication network is presented, comprising: the vehicle as defined in any of claims 1 to 12; and a teleoperator station for use by a teleoperator to remotely drive the vehicle via the wireless communication network.

In a further aspect of the present invention, a method for video encoding and/or transmission of live video data captured at a vehicle that is remotely driven via a wireless communication network is presented, comprising: capturing live video data of the vehicle's environment; encoding the captured live video data; transmitting the encoded live video data via the wireless communication network; and controlling the video encoding and/or the transmission, wherein the controlling controls the video encoding to optimize the video encoding of the captured live data and/or controls the transmission to optimize the transmission of the encoded live data, wherein the controlling is based on one, two or all of: (i) pre-determined location information associated with a current location of the vehicle; (ii) real-time driving information associated with current driving parameters of the vehicle, and; (iii) real-time environment information associated with a current environment of the vehicle.

It shall be understood that the vehicle of claim 1, the system of claim 13 and the method of claim 14 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

These and other aspects of the present invention will be apparent from and elucidated with reference to the embodiments described hereinafter. In the following drawings.

DETAILED DESCRIPTION

Figure 1:
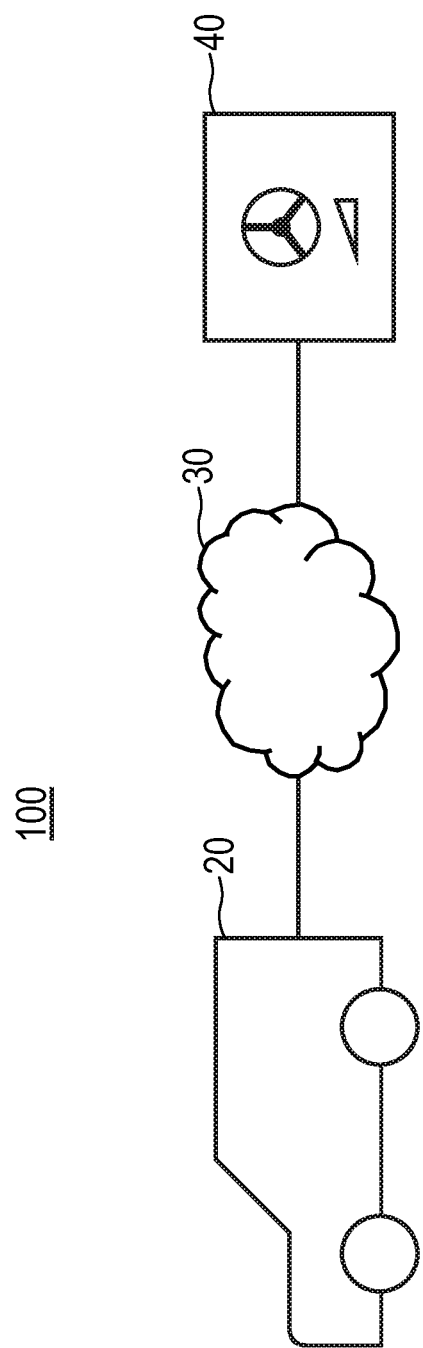
FIG. 1 shows schematically and exemplarily an embodiment of a system for remotely driving a vehicle via a wireless communication network.

FIG. 1 shows schematically and exemplarily an embodiment of a system 100 for remotely driving a vehicle 20 via a wireless communication network 30. The system 100 comprises a vehicle 20 that is adapted to be remotely driven via the wireless communication network 30. Moreover, the system 100 comprises a teleoperator station 40 for use by the teleoperator to remotely drive the vehicle 20 via the wireless communication network 30. To this end, the teleoperator station 40 receives live video data providing a view of the vehicle's environment from the vehicle 20 and displays the live video data to the teleoperator. The teleoperator reacts to the live video data by using a control interface provided by the teleoperator station 40 to generate drive control commands for controlling the driving of the vehicle 20. The drive control commands are sent from the teleoperator station 40 to the vehicle 20.

Figure 2:
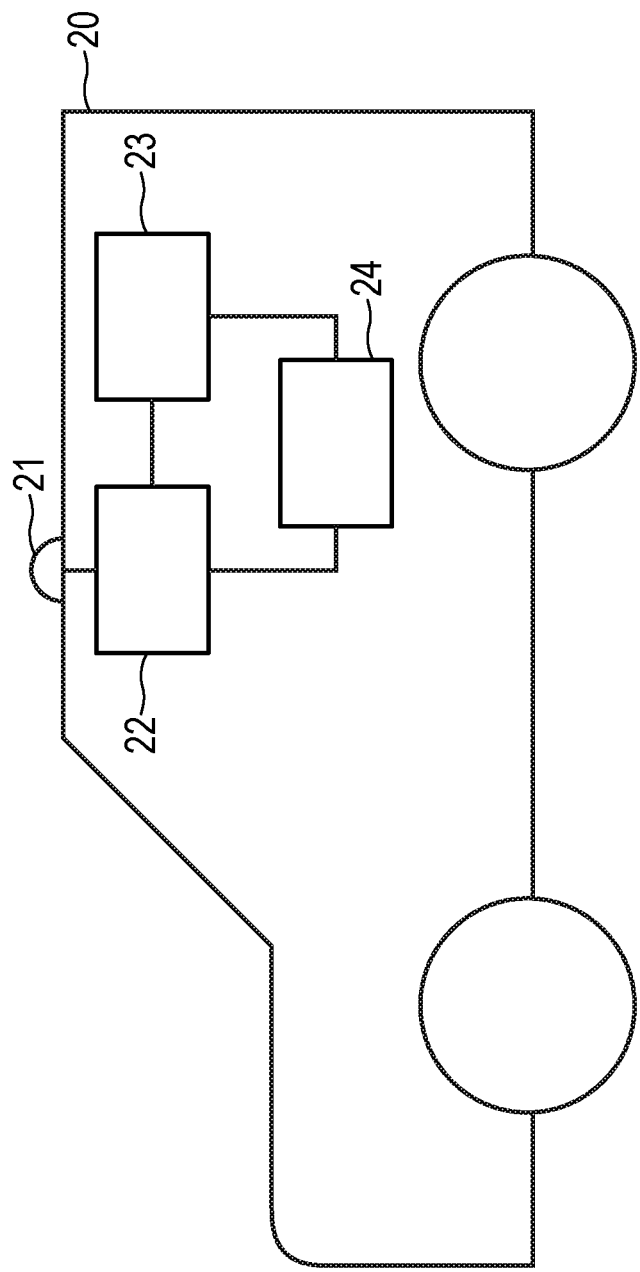
FIG. 2 shows schematically and exemplarily an embodiment of a vehicle that is adapted to be remotely driven via a wireless communication network.

An embodiment of a vehicle 20 that is adapted to be remotely driven via a wireless communication network 30 is schematically and exemplarily shown in FIG. 2. The vehicle 20 may be used in the system 100 for remotely driving a vehicle 20 via a wireless communication network 30 shown in FIG. 1. In this embodiment, the vehicle 20 is a modified car that provides the required on-board infrastructure for teleoperation. This can include actuators for controlling the vehicle 20, a capturing unit 21 for capturing live video data of the vehicle's environment, and appropriate interfaces for bi-directional communication with the teleoperator station 40 via the wireless communication network 30. The actuators can be mechanical actuators that directly actuate on the vehicle's steering wheel, speed pedal and brakes. Alternatively, already present actuators of the vehicle (e.g., for adjusting the orientation of the vehicle's wheels) may be controlled via an electronic interface.

The vehicle 20, here, comprises the capturing unit 21 for capturing live video data of the vehicle's environment, a video encoding unit 22 for video encoding the captured live video data, a transmission unit 23 for transmitting the encoded live video data via the wireless communication network 30, and a control unit 24 for controlling the video encoding unit 22 and/or the transmission unit 23.

According to the present invention, the control unit 24 is adapted to control the video encoding unit 22 to optimize the video encoding of the captured live video data and/or to control the transmission unit 23 to optimize the transmission of the encoded live video data. In particular, the controlling is based on one, two or all of: (i) pre-determined location information associated with a current location of the vehicle 20; (ii) real-time driving information associated with current driving parameters of the vehicle 20, and; (iii) real-time environment information associated with a current environment of the vehicle 20.

In this embodiment, the control unit 24 is adapted to control one or more video encoding parameters, wherein the controlled video encoding parameter(s) is/are selected from the group consisting of: a bitrate; a spatial resolution; a color depth; a color format; a frame rate; a region-of-interest, a digital zoom, and; an insertion of intra coded frames. These parameters allow for an adaptation of the quality vs. bitrate operating point of the video encoding.

Additionally or alternatively, the control unit 24 can be adapted to control a pre-processing of the captured live video data in order to simplify the video encoding of the captured live video data. For example, the pre-processing may include a low-pass filtering or an edge filtering of the captured live video data in order to reduce the amount of high frequency components in the captured live video data, which allows for a more efficient video encoding of the captured live video data.

In this embodiment, the control unit 24 is adapted to control one or more transmission parameters, wherein the controlled transmission parameter(s) is/are selected from the group consisting of: a transmission bitrate; a transmission protection; a wireless communication network carrier, and; a prioritization of data packets via one or more wireless communication network carriers. These parameters are well suited for optimizing the quality of the transmission of the encoded live video data.

Additionally or alternatively, the control unit 24 can be adapted to control, if multiple vehicles 20 that are adapted to be remotely driven via the wireless communication network 30 transmit encoded live video data in a same cell of the wireless communication network 30, an allocation of a transmission bitrate over the multiple vehicles 20. For example, the allocation of the transmission bitrate may be based on a statistical multiplexing scheme that considers the current bitrate requirements of the encoded live video data transmitted from each of the multiple vehicles 20.

In this embodiment, the pre-determined location information is selected from the group consisting of: expected wireless communication network characteristics at the current location of the vehicle 20; an expected speed of the vehicle 20 at the current location of the vehicle 20, and; a complexity of the environment at the current location of the vehicle 20. For example, if the wireless communication network 30 is expected to not be very reliable at the current location of the vehicle 20, it may be preferable to increase the transmission protection of the transmission of the encoded live video data. Similar, if the capacity of the transmission channel at the current location of the vehicle 20 is expected to be rather low, it may be preferable to reduce the transmission bitrate used for the encoded live video data. Similar, if the complexity of the environment at the current location of the vehicle 20 is rather high, e.g., because the vehicle 20 is remotely driven along an avenue with many trees with leaves, it may be preferable to low-pass filter or edge filter the captured live video data in order to simplify the video encoding of the captured live video data of the high complexity environment. In contrast, if the complexity of the environment at the current location of the vehicle 20 is rather low, e.g., because the vehicle 20 is remotely driven within a tunnel, one or more video encoding parameters, such as a spatial resolution, a color depth or a frame rate, may be controlled in order to save bitrate in the video encoding of the captured live video data of the low complexity environment. As another example, it may be preferable in high complexity environments to acquire more available transmission bitrate upfront to entering such environments. This may require using another or an additional wireless communication network carrier (additional SIM card). The complexity of the environment may be indicated and/or quantified by a number of different metrics. For example, it may be indicated and/or quantified in terms of the bitrate required for video encoding the captured live video data at a distinct video quality. This information may be determined a-priori, for example, based on a-priori video encoder runs performed on video data captured at the current location of the vehicle 20. Alternatively, the metric with which the complexity of the environment is indicated and/or quantified may directly consider the content of video data captured at the current location of the vehicle 20. For example, it may consider the amount of high frequency components of the captured video data.

Figure 3:
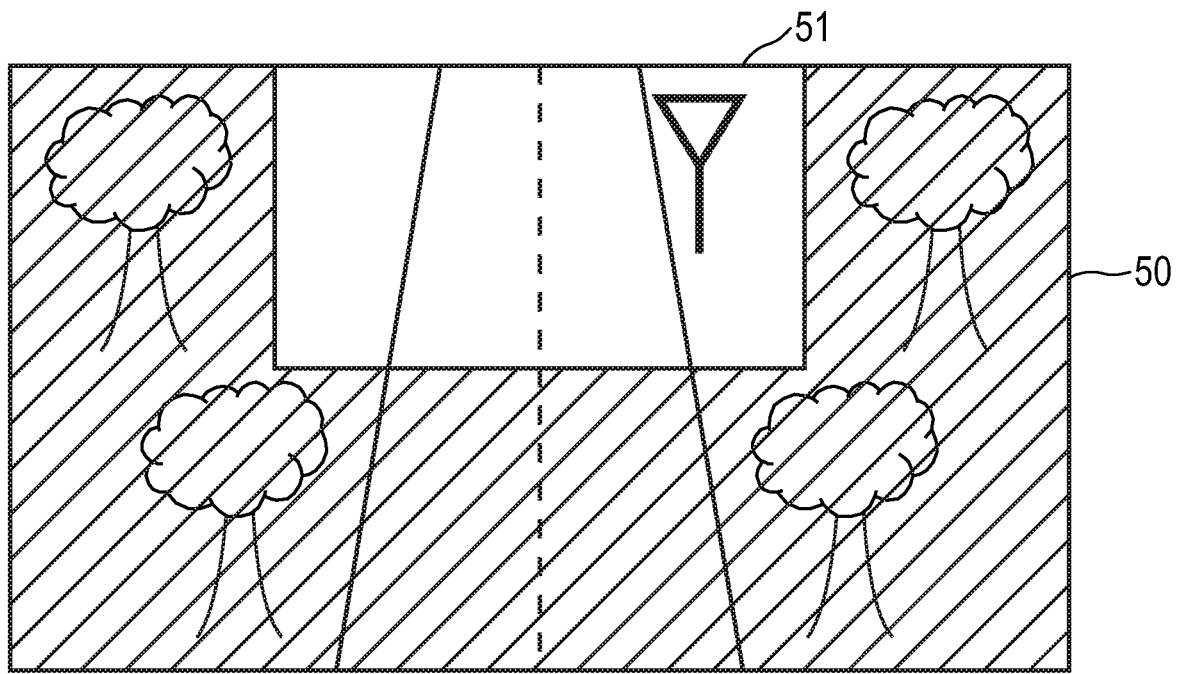
FIG. 3 shows schematically and exemplarily the encoding of the captured live video data using a region-of-interest and a digital zoom.
Figure 3:
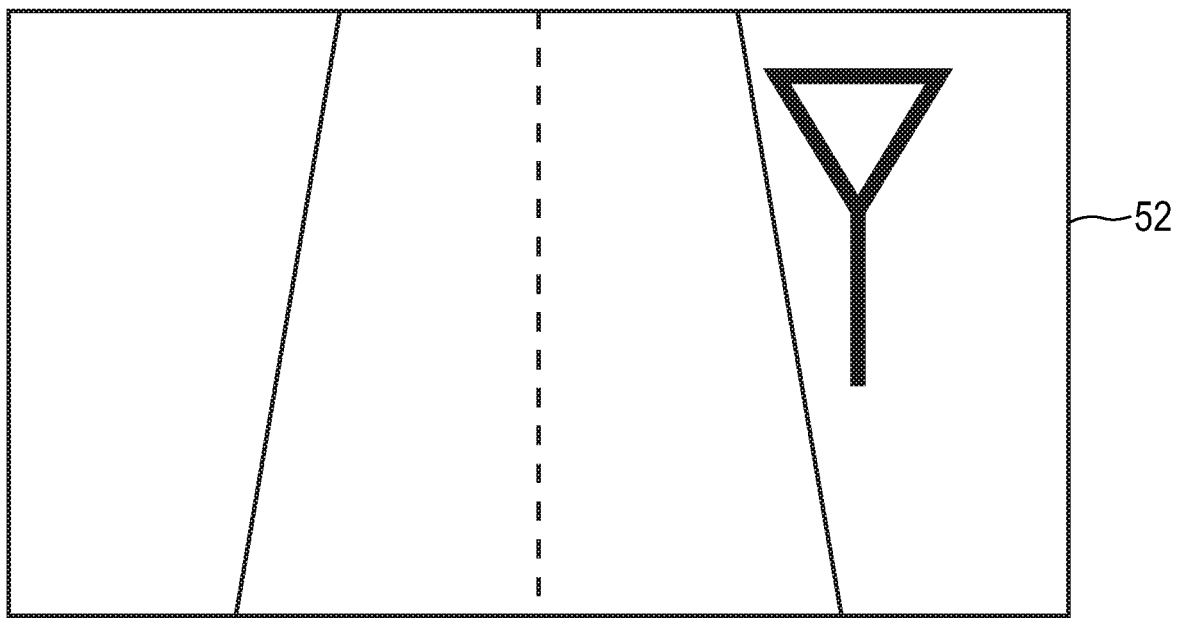

In this embodiment, the real-time driving information is selected from the group consisting of: a current speed of the vehicle 20; a current direction of the vehicle 20; a current steering angle of the vehicle 20, and; a current inclination of the vehicle 20. For example, if the vehicle 20 is remotely driven at a rather high current speed, a digital zoom 52 may be used in the video encoding of the captured live video data 50 in order to highlight or improve the visibility of higher distance objects like traffic lights or traffic signs. This is schematically and exemplarily shown in FIG. 3 (*b*). Similar, a region-of-interest 51 may be defined in the captured live video data 50 for an area in front of the vehicle 20. This region-of-interest 51 may then be given a higher quality in the video encoding of the captured live video data 50 while areas outside the region-of-interest 51, for example, objects of less importance, such as buildings, the sky and so on, may be given a lower quality in the video encoding of the captured live video data 50. This is schematically and exemplarily shown in FIG. 3 (*a*). In contrast, if the vehicle 20 is remotely driven at a rather low current speed, it may be preferable to neither use a digital zoom 52 nor a region-of-interest 51 and rather give the same quality to the whole captured live video data 50 in the video encoding of the captured live video data 50. As another example, if the vehicle 20 is remotely driven at a rather high current speed, it may be preferable to acquire more available transmission bitrate. This may require using another or an additional wireless communication network carrier (additional SIM card).

In this embodiment, the real-time environment information is selected from the group consisting of: a time of day in the current environment of the vehicle 20; a weather in the current environment of the vehicle 20; lighting conditions in the current environment of the vehicle 20, and a traffic in the current environment of the vehicle 20. For example, if the traffic in the current environment of the vehicle 20 is rather high, it may be preferable to not neither use a digital zoom 52 or a region-of-interest 51 and rather give the same quality to the whole captured live video data in the video encoding of the captured live video data. Similar, if the weather in the current environment of the vehicle 20 is very bad, e.g., because it is raining excessively, and/or the lighting conditions in the current environment of the vehicle 20 are problematic, e.g., because the sun is glaring, it may be preferable to pre-processing the captured live video data in order to simplify the video encoding of the captured live video data. As another example, if the time of day in the current environment of the vehicle 20 is night and the lighting conditions in the current environment of the vehicle 20 are rather low, it may be preferable to only use a gray scale color format in the video encoding of the captured live video data in order to save bitrate.

In this embodiment, the pre-determined location information at the current location of the vehicle 20 is provided in a map that has been determined a-priori. For example, the pre-determined location information may be determined a-priori for each road segment in a certain geographical area, wherein the map data may then be used—alone or together with the real-time driving information associated with current driving parameters of the vehicle 20 and/or the real-time environment information associated with the current environment of the vehicle 20—by the control unit 24 to control the video encoding unit 22 to optimize the video encoding of the captured live video data and/or to control the transmission unit 23 to optimize the transmission of the encoded live video data. In this embodiment, the map data is used by the control unit 24 for an on-the-fly control of the video encoding of the captured live video data and/or the transmission of the encoded live video data. Alternatively, suitable video encoding parameter(s) and/or transmission parameter(s) can be determined offline (beforehand) based on the pre-determined location information provided in the map. Moreover, it is possible that the control of the one or more video encoding parameter(s) and/or the one or more transmission parameter(s) is implemented in the control unit 24 using a neural network that has been suitably training using the map data and corresponding video encoding parameter(s) and/or transmission parameter(s). These may have been determined manually, e.g., by running tests with different parameters and by selected the most suitable parameters from the standpoint of the teleoperator at the teleoperator station 40.

In this embodiment, the prioritization of data packets via one or more wireless communication network carriers comprises sending parts of the encoded live video data via a first carrier or network path with a first expected wireless communication network performance and sending other parts of the encoded live video data via a second carrier with a second expected wireless communication network performance, wherein the first expected wireless communication network performance and the second expected wireless communication network performance differ in terms of one, two, three or all of: a reliability of the carrier or network path, a latency of the carrier or network path, a cost of transmission via the carrier or network path, and an availability of the carrier or network path. For example, it may be preferable to send more important parts of the encoded live video data, such as intra coded frame, recovery points, random access points and reference frames that are important for the decoding of multiple other video frames (e.g., in a bitstream with (temporal) coding layers) via a more reliable carrier or network path or a carrier or network path that has a lower latency. In contrast, less important parts of the encoded live video data may preferably be send via a carrier or network path that has a lower cost of transmission.

In this embodiment, the region-of-interest 51 is given a higher bitrate in the video encoding of the captured live video data 50. This has already been discussed above. Additionally or alternatively, a size, shape and/or location of the region-of-interest 51 may repeatedly be adjusted in the captured live video data 50 based on the pre-determined location information associated with the current location of the vehicle 20 and/or the real-time driving information associated with current driving parameters of the vehicle 20 (cf. the discussion with respect to FIG. 3 (*a*) above) and/or the real-time environment information associated with a current environment of the vehicle 20. For example, if the road at the current location of the vehicle 20 is a multi-lane road, it may be preferable that the size of the region-ofinterest 51 is adjusted in the captured live video data 50 to be larger than if the road at the current location of the vehicle 20 is a single-lane road. Similar, it may be preferable that the size and/or shape of the region-of-interest 51 is adjusted to be larger when the vehicle 20 approaches an intersection. As another example, if the vehicle 20 approaches an intersection with only one side road, it may be preferable that the location of the region-of-interest 51 is adjusted to be more on the side of the road on which the side road intersects with the road. Similar, it may be preferable that the size, shape and/or location of the region-of-interest 51 is adjusted in a similar manner if the current steering angle of the vehicle 20 is large. As yet a further example, if the lighting conditions in the current environment of the vehicle 20 are rather bad, it may be preferable that the size of the region-of-interest 51 is adjusted in the captured live video data 50 in order for the teleoperator to be able to better focus on the most important parts (e.g., the street) of the current environment of the vehicle 20.

In this embodiment, the expected wireless communication network characteristics at the current location of the vehicle 20 comprise an expected latency of the wireless communication network 30 and the prioritization of data packets via one or more wireless communication network carriers comprises a redundant transmission of parts of the encoded live video data via multiple carriers, such as using Forward Error Correction (FEC) methods. This improves the likelihood of receiving data packets with a lower latency.

In this embodiment, the expected speed of the vehicle 20 at the current location of the vehicle 20 and/or the current speed of the vehicle 20 and/or the current direction of the vehicle 20 and/or the current steering angle of the vehicle 20 and/or the current inclination of the vehicle 20 is used by the control unit 24 as an indication of how many bits to use for the video encoding of the captured live video data. For example, if the expected speed of the vehicle 20 at the current location of the vehicle 20 and/or the current speed of the vehicle 20 is rather low or even zero, e.g., if the vehicle 20 is currently standing still in front of a traffic light, fewer temporal changes may be expected in the captured live video data, wherefore it may be expected that the video encoding of the captured live video data will require fewer bits (lower bitrate). Similar, if the current steering angle of the vehicle 20 is rather large (strong steering), more temporal changes may be expected in the captured live video data, wherefore it may be expected that the video encoding of the captured live video data will require more bits (higher bitrate).

In this embodiment, the capturing unit 21 is adapted to capture the live video data 50 of the vehicle's environment from multiple positions and/or in multiple directions and the control unit 24 is adapted to control the video encoding unit 22 and/or the transmission unit 23 differently for parts of the live video data captured from different positions and/or different directions. For example, the capturing unit 21 may comprise a rather wide angle front camera that may be positioned on the roof or in the front of the vehicle 20 as well as two side cameras that may be positioned on the roof or in the front of the vehicle 20. It may then be preferable that the control unit 24 controls the video encoding unit 22 and/or the transmission unit 23 differently for parts of the live video data captured by the front camera and parts of the live video data captured by the side cameras. For example, if the vehicle 20 is remotely driven at a rather high current speed, a higher bitrate may be used for the video encoding of the parts of the live video data captured by the front camera, and if the vehicle 20 is remotely driven at a rather low current speed, a higher bitrate may be used for the video encoding of the parts of the live video data captured by the side cameras.

Figure 4:
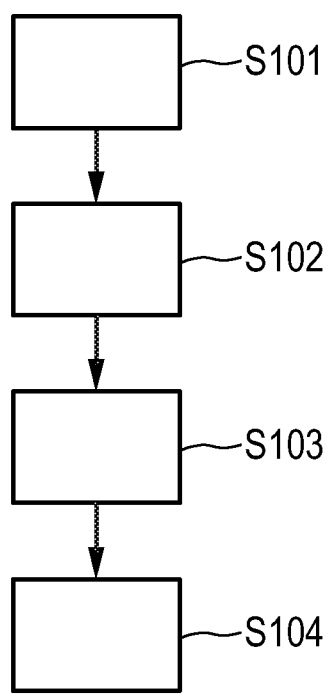
FIG. 4 shows a flowchart exemplarily illustrating an embodiment of a method for remotely driving a vehicle via a wireless communication network.

In the following, an embodiment of a method for remotely driving a vehicle 20 via a wireless communication network 30 will exemplarily be described with reference to a flowchart shown in FIG. 4. In this embodiment, the method is performed by the vehicle 20 shown in FIG. 2.

In step S101, live video data of the vehicle's environment is captured. In this example, this step is performed by the capturing unit 21.

In step S102, the captured live video data is encoded. In this example, this step is performed by the video encoding unit 22.

In step S103, the encoded live video data is transmitted via the wireless communication network 30. In this example, this step is performed by the transmission unit 23.

In step S104, the video encoding and/or the transmission is controlled. In this example, this step is performed by the control unit 24.

The controlling controls the video encoding to optimize the video encoding of the captured live data and/or controls the transmission to optimize the transmission of the encoded live data, wherein the controlling is based on one, two or all of: (i) pre-determined location information associated with a current location of the vehicle 20; (ii) real-time driving information associated with current driving parameters of the vehicle 20, and; (iii) real-time environment information associated with a current environment of the vehicle.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Operations such as the capturing of live video data of the vehicle's environment, the encoding the captured live video data, the transmitting the encoded live video data via the wireless communication network, the controlling the video encoding and/or the transmission, et cetera, which are performed by one or more units or devices, can also be performed by a different number of units or devices. These processes can be implemented fully or at least in part as program code of a computer program and/or fully or at least in part as a corresponding hardware.

Any reference signs in the claims should not be construed as limiting the scope.

The present invention relates to a vehicle that is adapted to be remotely driven via a wireless communication network. The vehicle comprises a capturing unit for capturing live video data of the vehicle's environment, a video encoding unit for video encoding the captured live video data, a transmission unit for transmitting the encoded live video data via the wireless communication network, and a control unit for controlling the video encoding unit and/or the transmission unit. The control unit is adapted to control the video encoding unit to optimize the video encoding of the captured live video data and/or to control the transmission unit to optimize the transmission of the encoded live video data, wherein the controlling is based on one, two or all of: (i) pre-determined location information associated with a current location of the vehicle; (ii) real-time driving information associated with current driving parameters of the vehicle, and; (iii) real-time environment information associated with a current environment of the vehicle.

The embodiments described above are only descriptions of preferred embodiments of the present invention, and do not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

What is claimed is:

1. A vehicle that is adapted to be remotely driven via a wireless communication network, comprising:
 a capturing unit for capturing live video data of the vehicle's environment; a video encoding unit for video encoding the captured live video data; a transmission unit for transmitting the encoded live video data via the wireless communication network; and a control unit for controlling the video encoding unit and/or the transmission unit; wherein the control unit is adapted to control the video encoding unit to optimize the video encoding of the captured live video data and/or to control the transmission unit to optimize the transmission of the encoded live video data, wherein the controlling is based on one, two or all of: (i) pre-determined location information associated with a current location of the vehicle; (ii) real-time driving information associated with current driving parameters of the vehicle, and; (iii) real-time environment information associated with a current environment of the vehicle and wherein for optimizing the video encoding of the captured live video data and/or the transmission of the encoded live video data, the control unit is further adapted for at least one of a) defining a region-of-interest in the captured live video data for an area in front of the vehicle based on a speed of the vehicle, wherein in the region-of-interest, a higher bitrate is given in the video encoding of the captured live video data, and identifying a complexity of the vehicle's environment and low-pass filtering or edge filtering the captured live video data when the complexity of the vehicle's environment is high.

2. The vehicle of claim 1, wherein the control unit is adapted to control (i) one or more video encoding parameters, wherein the controlled video encoding parameter(s) is/are selected from the group consisting of: a bitrate; a spatial resolution; a color depth; a color format; a frame rate; a region-of-interest, a digital zoom, and; an insertion of intra coded frames, and/or (ii) a pre-processing of the captured live video data in order to simplify the video encoding of the captured live video data.

3. The vehicle of claim 1, wherein the control unit is adapted to control (i) one or more transmission parameters, wherein the controlled transmission parameter(s) is/are selected from the group consisting of: a transmission bitrate; a transmission protection; a wireless communication network carrier, and; a prioritization of data packets via one or more wireless communication network carriers, and/or (ii), if multiple vehicles that are adapted to be remotely driven via the wireless communication network transmit encoded live video data in a same cell of the wireless communication network, an allocation of a transmission bitrate over the multiple vehicles.

4. The vehicle of claim 1, wherein the predetermined location information is selected from the group consisting of: expected wireless communication network characteristics at the current location of the vehicle; an expected speed of the vehicle at the current location of the vehicle, and; a complexity of the environment at the current location of the vehicle.

5. The vehicle of claim 1, wherein the real-time driving information is selected from the group consisting of: a current speed of the vehicle; a current direction of the vehicle, a current steering angle of the vehicle; and; a current inclination of the vehicle.

6. The vehicle of claim 1, wherein the real-time environment information is selected from the group consisting of: a time of day in the current environment of the vehicle; a weather in the current environment of the vehicle; lighting conditions in the current environment of the vehicle, and a traffic in the current environment of the vehicle.

7. The vehicle of claim 1, wherein the pre-determined location information is provided in a map that has been determined a-priori.

8. The vehicle of claim 3, wherein the prioritization of data packets via one or more wireless communication network carriers comprises sending parts of the encoded live video data via a first carrier or network path with a first expected wireless communication network performance and sending other parts of the encoded live video data via a second carrier with a second expected wireless communication network performance, wherein the first expected wireless communication network performance and the second expected wireless communication network performance differ in terms of one, two, three or all of: a reliability of the carrier or network path, a latency of the carrier or network path, a cost of transmission via the carrier or network path, and an availability of the carrier or network path.

9. The vehicle of claim 2, wherein the region-of-interest is given a higher bitrate in the video encoding of the captured live video data and/or wherein a size, shape and/or location of the region-of-interest is repeatedly adjusted in the captured live video data based on the pre-determined location information associated with the current location of the vehicle and/or the real-time driving information associated with current driving parameters of the vehicle and/or the real-time environment information associated with a current environment of the vehicle.

10. The vehicle of claim 4, wherein the expected wireless communication network characteristics at the current location of the vehicle comprise an expected latency of the wireless communication network and the prioritization of data packets via one or more wireless communication network carriers comprises a redundant transmission of parts of the encoded live video data via multiple carriers.

11. The vehicle of claim 1, wherein the capturing unit is adapted to capture the live video data of the vehicle's environment from multiple positions and/or in multiple directions and the control unit is adapted to control the video encoding unit and/or the transmission unit differently for parts of the live video data captured from different positions and/or different directions.

12. The vehicle of claim 1, wherein for optimizing the video encoding of the captured live video data and/or the transmission of the encoded live video data, the control unit is further adapted for
 a) defining a region-of-interest in the captured live video data for an area in front of the vehicle based on a speed of the vehicle, wherein in the region-of-interest, a higher bitrate is given in the video encoding of the captured live video data, and b) identifying a complexity of the vehicle's environment and low-pass filtering or edge filtering the captured live video data when the complexity of the vehicle's environment is high.

13. A system for remotely driving a vehicle via a wireless communication network, comprising:
the vehicle including:
a capturing unit for capturing live video data of the vehicle's environment;
a video encoding unit for video encoding the captured live video data;
a transmission unit for transmitting the encoded live video data via the wireless communication network; and
a control unit for controlling the video encoding unit and/or the transmission unit;
wherein the control unit is adapted to control the video encoding unit to optimize the video encoding of the captured live video data and/or to control the transmission unit to optimize the transmission of the encoded live video data,
wherein the controlling is based on one, two or all of: (i) pre-determined location information associated with a current location of the vehicle; (ii) real-time driving information associated with current driving parameters of the vehicle, and; (iii) real-time environment information associated with a current environment of the vehicle, and
wherein for optimizing the video encoding of the captured live video data and/or the transmission of the encoded live video data, the control unit is further adapted for at least one of a) defining a region-of-interest in the captured live video data for an area in front of the vehicle based on a speed of the vehicle, wherein in the region-of-interest, a higher bitrate is given in the video encoding of the captured live video data, and
b) identifying a complexity of the vehicle's environment and lowpass filtering or edge filtering the captured live video data when the complexity of the vehicle's environment is high; and
a teleoperator station for use by a teleoperator to remotely drive the vehicle via the wireless communication network.

14. The system of claim 13, wherein for optimizing the video encoding of the captured live video data and/or the transmission of the encoded live video data, the control unit is further adapted for
a) defining a region-of-interest in the captured live video data for an area in front of the vehicle based on a speed of the vehicle, wherein in the region-of-interest, a higher bitrate is given in the video encoding of the captured live video data, and
b) identifying a complexity of the vehicle's environment and low-pass filtering or edge filtering the captured live video data when the complexity of the vehicle's environment is high.

15. A method for video encoding and/or transmission of live video data captured at a vehicle that is remotely driven via a wireless communication network, comprising:
capturing live video data of the vehicle's environment;
encoding the captured live video data;
transmitting the encoded live video data via the wireless communication network;
and controlling the video encoding and/or the transmission, wherein the controlling controls the video encoding to optimize the video encoding of the captured live data and/or controls the transmission to optimize the transmission of the encoded live data, wherein the controlling is based on one, two or all of (i) pre-determined location information associated with a current location of the vehicle; (ii) real-time driving information associated with current driving parameters of the vehicle, and; (iii) real-time environment information associated with a current environment of the vehicle, and wherein for optimizing the video encoding of the captured live video data and/or the transmission of the encoded live video data, the control unit is further adapted for at least one of
a) defining a region-of-interest in the captured live video data for an area in front of the vehicle based on a speed of the vehicle, wherein in the region-of-interest, a higher bitrate is given in the video encoding of the captured live video data, and b) identifying a complexity of the vehicle's environment and low-pass filtering or edge filtering the captured live video data when the complexity of the vehicle's environment is high.

16. The method of claim 15, wherein for optimizing the video encoding of the captured live video data and/or the transmission of the encoded live video data, the control unit is further adapted for
a) defining a region-of-interest in the captured live video data for an area in front of the vehicle based on a speed of the vehicle, wherein in the region-of-interest, a higher bitrate is given in the video encoding of the captured live video data, and
b) identifying a complexity of the vehicle's environment and low-pass filtering or edge filtering the captured live video data when the complexity of the vehicle's environment is high.

* * * * *